United States Patent
Shin

(10) Patent No.: US 7,243,043 B2
(45) Date of Patent: Jul. 10, 2007

(54) METHOD OF TESTING HARD DISK DRIVE AND COMPUTER READABLE MEDIUM THEREFOR

(75) Inventor: Chang-ick Shin, Gumi-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 180 days.

(21) Appl. No.: 10/845,152

(22) Filed: May 14, 2004

(65) Prior Publication Data

US 2004/0230399 A1    Nov. 18, 2004

(30) Foreign Application Priority Data

May 15, 2003    (KR)    ............................. 2003-30893

(51) Int. Cl.
  *G06F 15/00*    (2006.01)
(52) U.S. Cl. .................. 702/182; 183/184; 183/185; 183/186; 183/187; 183/188; 714/42; 714/54; 717/176
(58) Field of Classification Search ............... 702/182, 702/183–188; 717/174, 176, 106; 714/42, 714/54
See application file for complete search history.

(56) References Cited

U.S. PATENT DOCUMENTS

| | | | |
|---|---|---|---|
| 4,888,549 A * | 12/1989 | Wilson et al. ............. | 324/73.1 |
| 5,442,305 A | 8/1995 | Martin et al. | |
| 5,644,705 A * | 7/1997 | Stanley ..................... | 714/42 |
| 5,835,703 A * | 11/1998 | Konno ...................... | 714/42 |
| 5,875,293 A | 2/1999 | Bell et al. | |
| 5,903,572 A | 5/1999 | Wright et al. | |
| 6,169,413 B1 * | 1/2001 | Paek et al. ................. | 324/760 |
| 6,208,477 B1 | 3/2001 | Cloke et al. | |
| 6,317,798 B1 | 11/2001 | Graf | |
| 6,434,498 B1 | 8/2002 | Ulrich et al. | |
| 6,434,499 B1 | 8/2002 | Ulrich et al. | |
| 6,516,053 B1 | 2/2003 | Ryan et al. | |

(Continued)

FOREIGN PATENT DOCUMENTS

JP    60-005646    1/1985

(Continued)

OTHER PUBLICATIONS

Mark Nelson, "Serial Communications Developer's Guide", 2nd Edition, 5 pages (copyrighted material).

(Continued)

*Primary Examiner*—Marc S. Hoff
*Assistant Examiner*—Phuong Huynh
(74) *Attorney, Agent, or Firm*—Staas & Halsey LLP

(57) ABSTRACT

A method of testing a plurality of devices, such as hard disk drives, in response to a random request by checking whether hard disk drive have been loaded, and sequentially allocating one test thread for each loaded hard disk drive. Each allocated thread performs a series of test job operations one by one when called and required for testing the loaded hard disk drive, and records a test status of each hard disk drive whenever one job operation of the test by the test thread is terminated to allow a next test thread to refer to the recorded test status. Each hard disk drive is tested according to a time required to test that hard disk drive.

26 Claims, 12 Drawing Sheets

U.S. PATENT DOCUMENTS 6,806,700 B2 * 10/2004 Wanek et al. ............ 324/158.1
6,850,994 B2 * 2/2005 Gabryjelski ................. 710/19
6,971,084 B2 * 11/2005 Grey et al. ................. 717/106

FOREIGN PATENT DOCUMENTS

| JP | 63-9337 | 1/1988 |
|----|---------|--------|
| JP | 1-222549 | 9/1989 |
| JP | 3-209601 | 9/1991 |
| JP | 8-298689 | 11/1996 |
| JP | 2000-215116 | 8/2000 |
| JP | 2002-21555 | 8/2002 |
| KR | 1997-7634 | 2/1997 |
| KR | 1997-76738 | 12/1997 |
| KR | 1998-35445 | 8/1998 |
| KR | 1998-47465 | 9/1998 |
| KR | 1998-31599 | 7/1999 |
| KR | 1999-60610 | 7/1999 |
| KR | 1999-60619 | 7/1999 |
| KR | 1999-65516 | 8/1999 |
| KR | 1999-70583 | 9/1999 |
| KR | U2000-0012526 | 7/2000 |
| KR | 2001-0049089 | 6/2001 |

OTHER PUBLICATIONS

Notice of Office Action issued by the Korean Patent Office on Nov. 30, 2004 in Korean patent application No. 10-2003-0030895 related to the present above-identified US patent application (2 pages), including English language translation thereof (2 pages).

Notice of Office Action issued by the Korean Patent Office on Feb. 22, 2005 in Korean patent application No. 10-2003-0030894 related to the present above-identified US patent application (2 pages), including English language translation thereof (2 pages).

U.S. Appl. No. 10/845,116, filed May 14, 2004, Sung-uk Moon et al., Samsung Electronics Co., Ltd., Suwon-Si, Republic of Korea.

U.S. Appl. No. 10/845,115, filed May 14, 2004, Min-Won Bae et al., Samsung Electronics Co., Ltd., Suwon-Si, Republic of Korea.

Japanese Office Action dated Aug. 22, 2006 received in a related foreign application.

Japanese Office Action dated Aug. 29, 2006 received in a related foreign application.

* cited by examiner

PRIOR ART

METHOD OF TESTING HARD DISK DRIVE AND COMPUTER READABLE MEDIUM THEREFOR

CROSS-REFERENCE TO RELATED APPLICATIONS

This application claims the priority benefit of Korean Patent Application No. 2003-30893, filed on May 15, 2003, in the Korean Intellectual Property Office, the disclosure of which is incorporated herein in its entirety by reference.

BACKGROUND OF THE INVENTION

1. Field of the Invention

The present invention relates to a method of testing a hard disk drive, and more particularly, to an improved method of testing a plurality of hard disk drives that are randomly loaded or unloaded and a computer readable medium therefor.

2. Description of the Related Art

As is generally known, a hard disk drive (HDD) combines and includes a head disk assembly (HDA) made up of mechanical components, and a printed circuit board assembly (PCBA) made up of circuit components. An HDD is generally used as a complementary memory device in which a head hovers a minute distance above a turning magnetic disk, data is magnetically recorded on or read from the disk, and a large volume of data can be accessed at a high speed.

HDDs are generally manufactured through a mechanical assembly process, a servo write process, a function test process, and a burn-in test process, and are then put through a post process which is like a final test process to confirm whether an HDD set that passed the burn-in test process was normally settled with defect processing. A process of manufacturing an HDD will now be described in detail. First, the mechanical assembly process is a process of assembling an HDA from mechanical components, and is usually performed in a clean room. The servo write process, performed second, is a process of recording a servo write pattern for servo control of an actuator on a disk, and is usually performed by a servo writer. The function test process, performed third, combines the HDA produced in the mechanical assembly process with the PCBA, and tests whether they match properly and operate together normally. In the function test process, the combination of the HDA and the PCBA is combined with a specific test system and put through a basic test for about 20 to 25 minutes. The burn-in test process, performed fourth, is the process that takes the longest time (usually 8 to 16 hours) in the manufacture of an HDD. In the burn-in test process, any defects on the disk are found and corrected.

The final test process, performed fifth, is a process to confirm whether an HDD set which passed the above-described burn-in test process was normally settled with defect processing, and tests the defect processing status of every HDD set using the specific test system. The final test process connects each HDD to a separate test computer and performs tests. Each test computer is connected to a host computer over a local area network (LAN), tests a connected HDD according to a test program, and outputs the results to the host computer. The host computer displays status data input from each test computer on a display unit, and an operator decides success or failure while monitoring the status data. HDDs that pass the final test process are shipped as finished products through a shipment test process, a packing and shipping process, etc.

Since, as described above, the burn-in test process takes the longest time in manufacturing an HDD, a burn-in testing apparatus is needed which can reliably test as many HDDs as possible in a limited time and in a limited space. Conventional testing apparatuses are disclosed in Korean Patent Publication No.1997-76738 (Dec. 12, 1997), Korean Patent Publication No. 1998-35445 (Aug. 5, 1998), Korean Patent Publication No. 1999-60619 (Jul. 26, 1999), Korean Patent Publication No. 1999-65516 (Aug. 5,1999), U.S. Pat. No. 6,434,498 (Aug. 13, 2002), U.S. Pat. No. 6,208,477 (Mar. 27, 2001), and U.S. Pat. No. 6,434,499 (Aug. 13, 2002).

FIG. 1 shows the exterior of a conventional hard disk drive testing apparatus disclosed in Korean Patent Publication 1997-76738, filed by Samsung Electronics Co., Ltd., assignee of the present Application. Referring to FIG. 1, a burn-in chamber 30 where HDDs are stacked is located in the front, and a control chamber 40, which is made up of lined-up power cards, is located in the rear of the HDD testing apparatus 200 and separated from the control chamber 30 by a partition 80. The power cards control the supply of power to each HDD stacked in the burn-in chamber 30, and to 20 to 24 test computers 50. Typically, each test computer 50 controls and monitors (tests) 6 HDDs.

A power distribution unit installed at an end of the control chamber 40 distributes power to the power cards and a host computer which manages the test computers 50 and receives input/output instructions from a manager. Meanwhile, a DC power supply installed at the other end of the control chamber 40 supplies power to the HDDs to be tested. Also, a display unit and a keyboard (not shown) are attached at one end of the burn-in chamber 30 for user interface, and heaters & blowers are installed at both ends of the burn-in chamber 30 for keeping a high temperature in the burn-in chamber 30.

FIG. 2 is a block diagram which shows the internal configuration of the apparatus shown in FIG. 1. Referring to FIG. 2, in the HDD testing apparatus 200 shown in FIG. 1, one host computer 600 and 20 to 24 test computers 612 through 618 are connected through a first control bus 660, and three dual channel IDE adapters 622, 624, and 626 are also connected to each test computer 612–618 through a second control bus 630. Also, two HDDs (HDD pairs of 642–644, 646–648, and 650–652) are connected to each dual channel IDE adapter 622, 624, and 626, respectively.

After booting the host computer 600, the host computer 600 sets up a communication network with the test computers 612 through 618 through the first control bus 660. The first control bus 660 may be implemented with a typical LAN. The test computers 612 through 618 are booted through the first control bus 660 to execute the test program and form a communication channel between the test computers 612 through 618 and the host computer 600. When the communication channel between the test computers 612 through 618 and the host computer 600 is formed, the host computer 600 receives status information from each of the test computers 612 through 618, displays the status on the screen of the display unit, and controls the temperature inside the burn-in chamber 30 using the heater.

When HDDs to be tested are inserted into the burn-in chamber 30 of the HDD testing apparatus 200, the test computers 612 through 618 detect installation of the HDD, for example, the HDD 652, and upload test codes and scripts to the HDDs via the dual channel IDE adapter 626. After this, the test computers 612 through 618 monitor the test results or the progress status through the IDE interface and transfer the data to the host computer 600, which then displays the test results or progress status on the screen of the display unit.

The conventional testing apparatus 200 shown in FIGS. 1 and 2 has a structure which connects each test computer to 6 HDDs, and thus is more efficient than prior 1 to 1 test methods. However, the testing apparatus 200 shown in FIGS. 1 and 2 uneconomically still requires 20 to 24 test computers. These test computers require a control chamber 40 of considerable size to house them. Also, because 3 expensive dual IDE adapters per test computer need to be installed, the testing apparatus 200 shown in FIGS. 1 and 2 is not significantly cheaper to build and implement than prior 1 to 1 test apparatuses. Also, there is a significant possibility of error generation, because, as shown in FIG. 2, the host computer 600 is connected to the test computers 612–618 through a three tier complex communication structure (i.e., the typical communication structure connecting one computer to another computer), and each of the test computers 612–618 again control the HDDs via another communication structure, which is the dual IDE adapters. Accordingly, because of the complex communication structure, it is also difficult to debug the system when an error occurs. Moreover, if the interface standard of the HDDs is changed, all IDE adapters must be replaced and the test program loaded in the test computers 612–618 must be modified.

Further, the time required for testing a hard disk drive varies depending on the type of the hard disk drive tested or on whether it has a defect. The testing efficiency of a hard disk drive also depends on the testing method.

More particularly, in the simplest testing method, an equal amount of time is assigned to a plurality of hard disk drives in consideration of the maximum test time allowed for a single hard disk drive. However, this method is not productive, because there can be unnecessary time consumption from the end of testing the first hard disk drive to the end of testing the last hard disk drive.

Therefore, a more efficient method of testing a plurality of hard disk drives in which each hard disk drive can be randomly loaded or unloaded is needed.

SUMMARY OF THE INVENTION

The present invention provides an efficient method of testing a plurality of hard disk drives in which each hard disk drive can be randomly loaded or unloaded to be tested. The present invention provides a computer readable medium having embodied thereon a computer program for the testing method.

Additional aspects and/or advantages of the invention will be set forth in part in the description which follows and, in part, will be obvious from the description, or may be learned by practice of the invention.

The present invention may be achieved by a method of testing a plurality of hard disk drives that can be randomly loaded and unloaded, comprising performing scanning to check whether hard disk drives have been loaded; sequentially allocating one test thread to each of the loaded hard disk drives, each test thread performing a series of test job operations one by one as each test thread is called and required for testing the loaded hard disk drive; and recording a test status of each of the loaded hard disk drives whenever one job operation of the test by the test thread is terminated to allow a next test thread to refer to the recorded test status.

The present invention may also be achieved by a computer readable medium having embodied thereon a computer program testing a plurality of hard disk drives that can be randomly loaded and downloaded, the computer readable medium comprising an event wait module that waits for an occurrence of an event selected from a group of events comprising an HDD scanning thread execution event, a test thread execution event, a user interface service event, an HDD scanning thread execution start event, and a test thread execution start event, and calls a corresponding thread for the event that has occurred; a scan event service module called when the HDD scanning thread execution event is called and detects the loading/unloading of hard disk drives; and a test thread execution event service module called when the test thread execution event occurs and tests the loaded hard disk drives while checking a status of the loaded hard disk drives through serial communications with the hard disk drives.

BRIEF DESCRIPTION OF THE DRAWINGS

The above and/or other features and advantages of the present invention will become more apparent by describing in detail exemplary embodiments thereof with reference to the attached drawings in which.

DETAILED DESCRIPTION OF THE PREFERRED EMBODIMENTS

Figure 1:
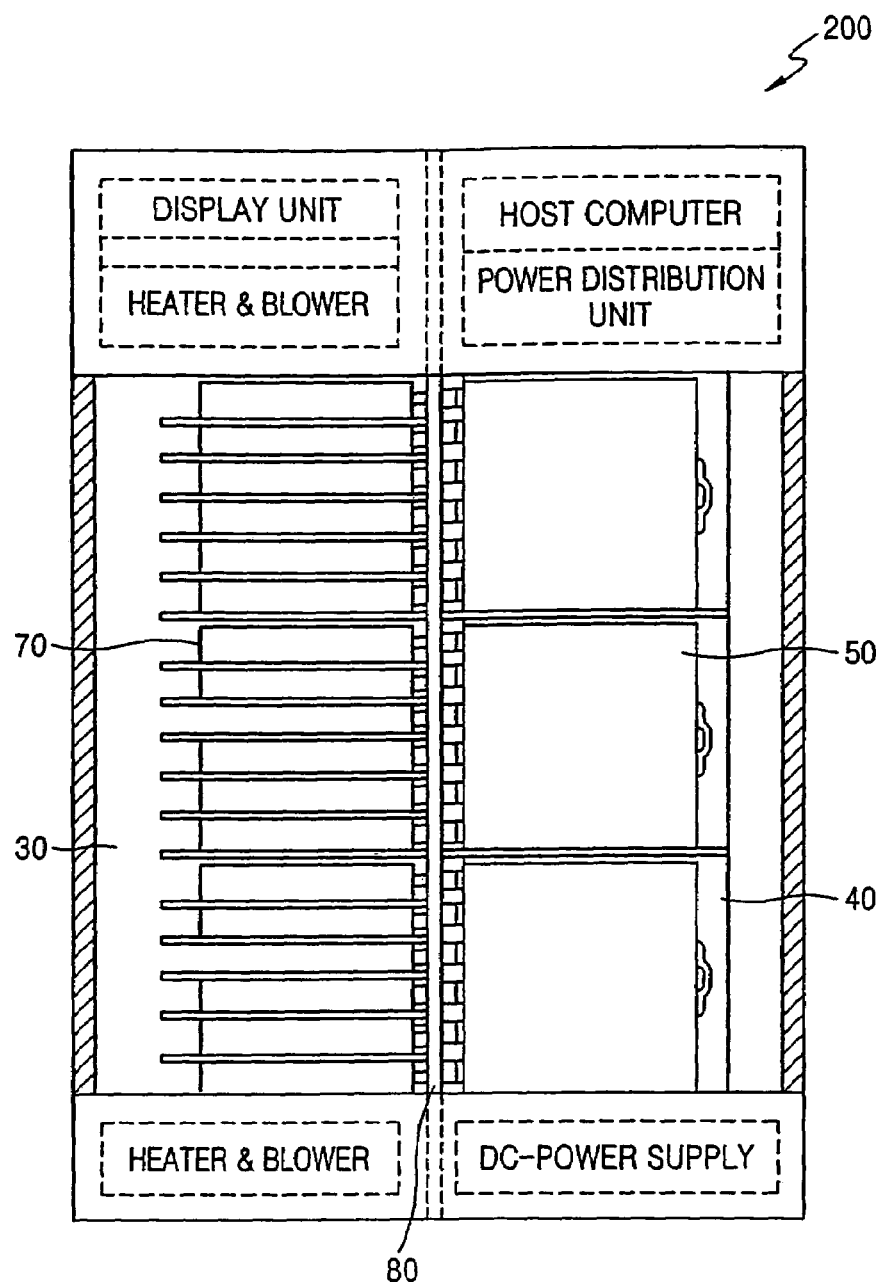
FIG. 1 shows the exterior of a conventional hard disk drive testing apparatus.
Figure 2:
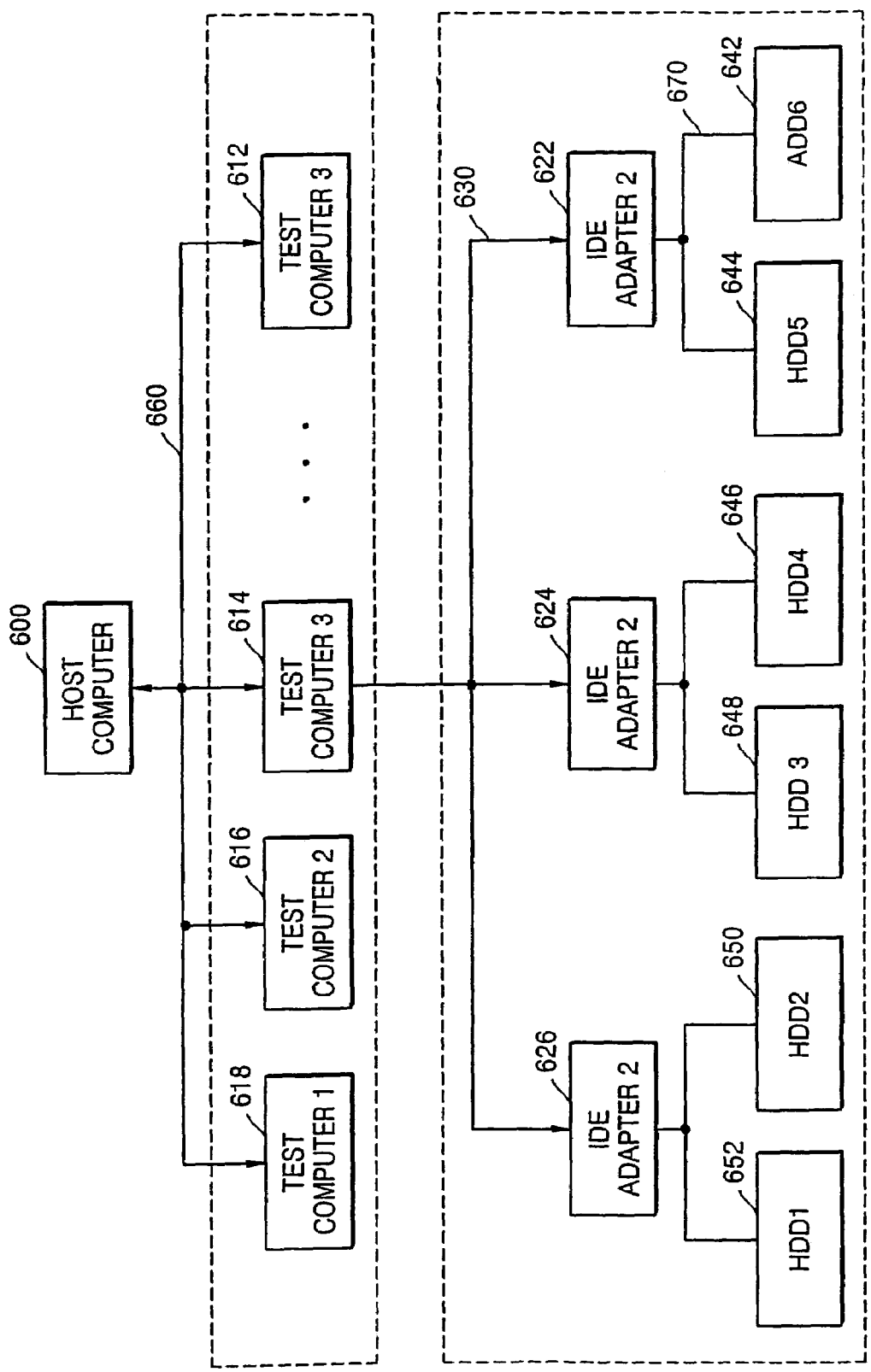
FIG. 2 is a functional block diagram showing the internal configuration of the conventional hard disk drive testing apparatus shown in FIG. 1.

Reference will now be made in detail to the embodiments of the present invention, examples of which are illustrated in the accompanying drawings, wherein like reference numerals refer to the like elements throughout. The embodiments are described below to explain the present invention by referring to the figures. For the sake of clarity and concision, technology related to the present invention that is not novel and is well known in the art to which the present invention pertains will not be described herein.

A disk testing apparatus testing a plurality of hard disk drives using only one host computer, without using test computers, is disclosed in the related Korean Patent Application No. 2003-30895 filed May 15, 2003 by Samsung Electronics Co., Ltd., assignee of the present Application, and also disclosed in a co-pending US patent application filed by Samsung Electronics Co., Ltd., assignee of the present Application, on May 14, 2004 in the U.S. Patent and Trademark Office, the entire contents of which are hereby incorporated by reference. As disclosed in the related co-pending U.S. patent application, a general computer equipped with serial communication ports may be used as a host computer in a serial communication HDD testing apparatus. In particular, a serial communication channel is selectively established between a hard disk drive to be tested and the host computer using two serial communication ports of the host computer and a serial communication switching device providing a plurality of selectable peripheral serial ports. It is possible to switch the serial communication channel of the host computer with a hard disk drive to another hard disk drive to be tested using another of the selectable serial communication ports of the switch, thereby enabling testing a plurality of hard disk drives using one host computer. To this end, the serial communication HDD testing apparatus still requires a burn-in chamber accommodating a stack of hard disk drives. The serial communication switching device is disclosed in the related Korean Patent Application No. 2003-30894 filed May 15, 2003 by Samsung Electronics Co., Ltd., assignee of the present Application, and also disclosed in a co-pending US patent application filed by Samsung Electronics Co., Ltd., assignee of the present Application, on May 14, 2004 in the US Patent and Trademark Office, the entire contents of which are hereby incorporated by reference.

Figure 3:
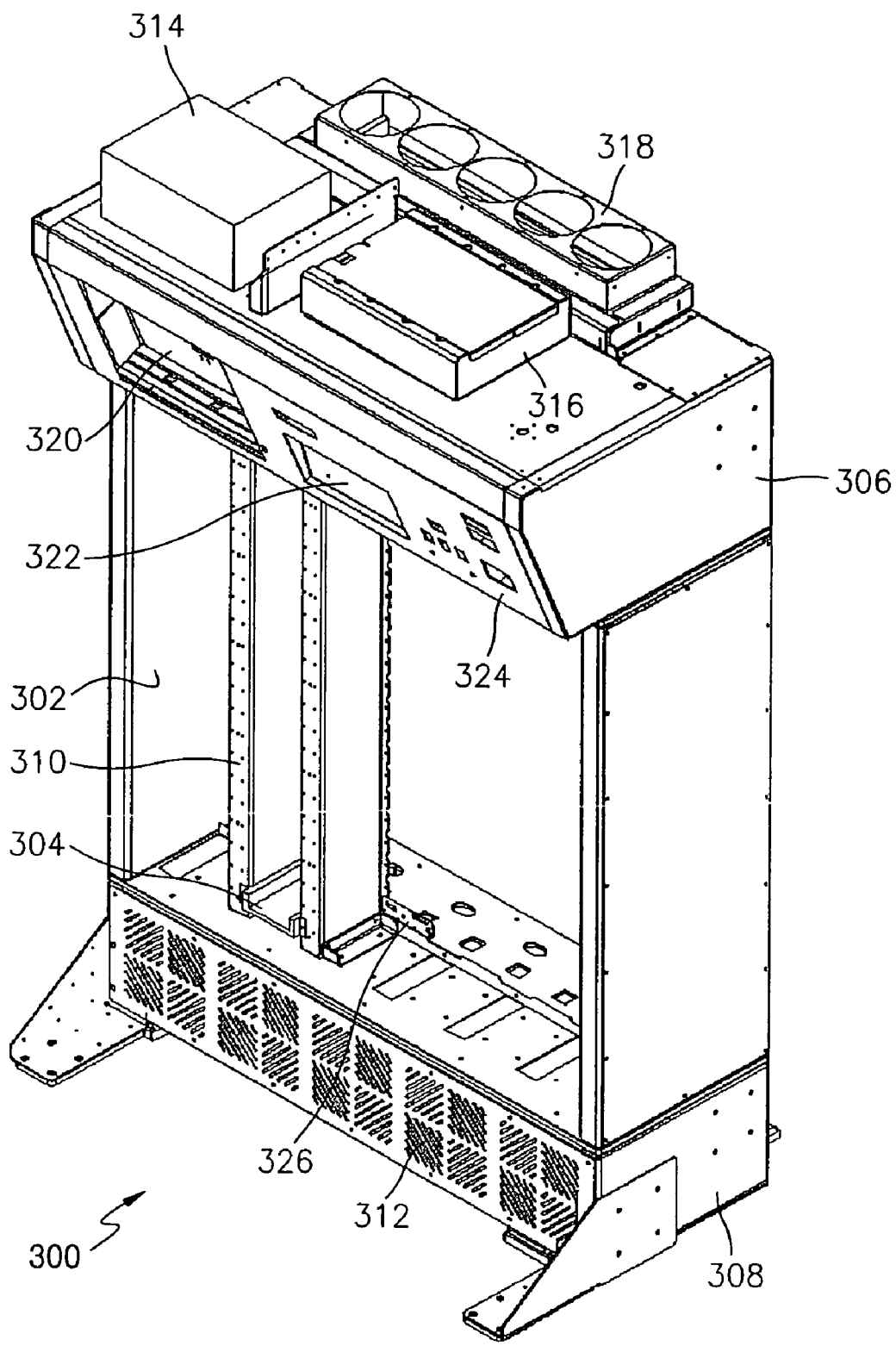
FIGS. 3 through 5 are perspective configuration views of a hard disk drive testing apparatus used to test hard disk drives, according to an embodiment of the present invention.
Figure 4:
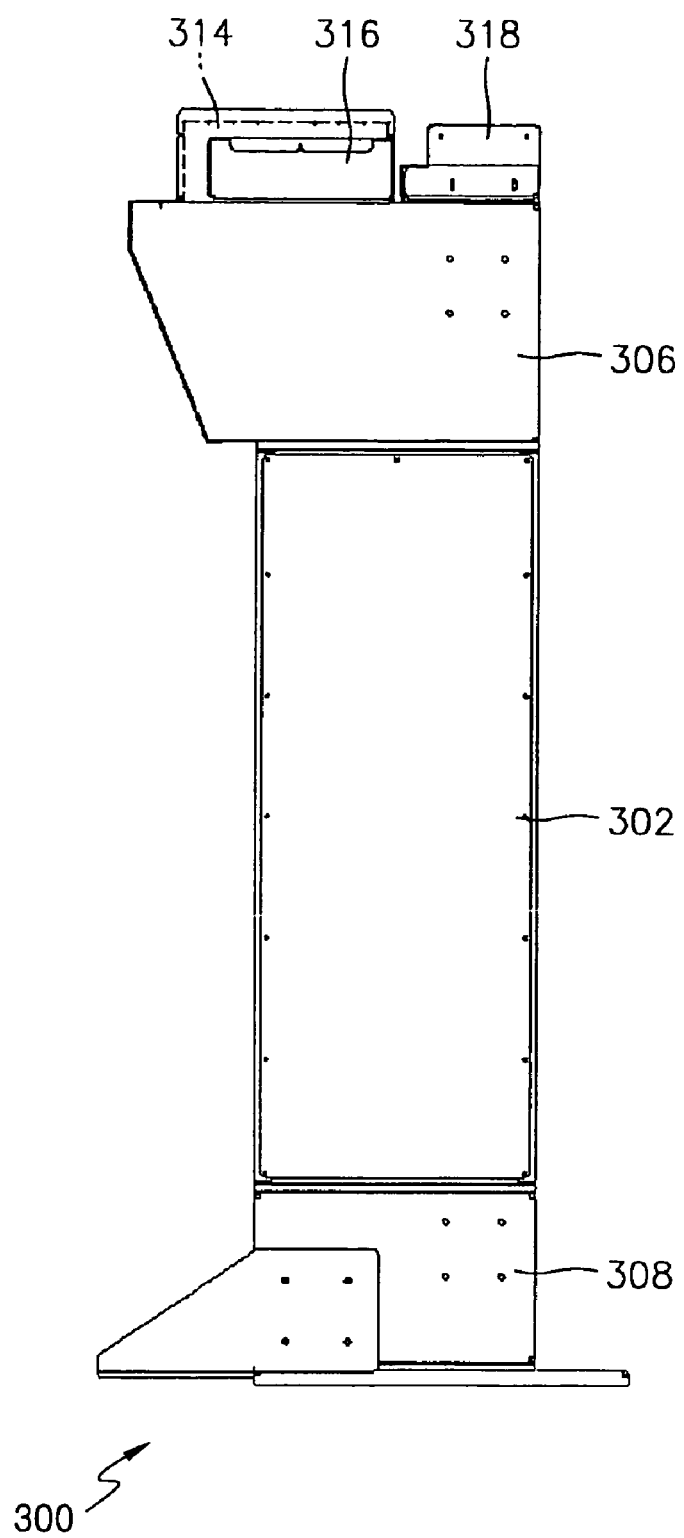
Figure 5:
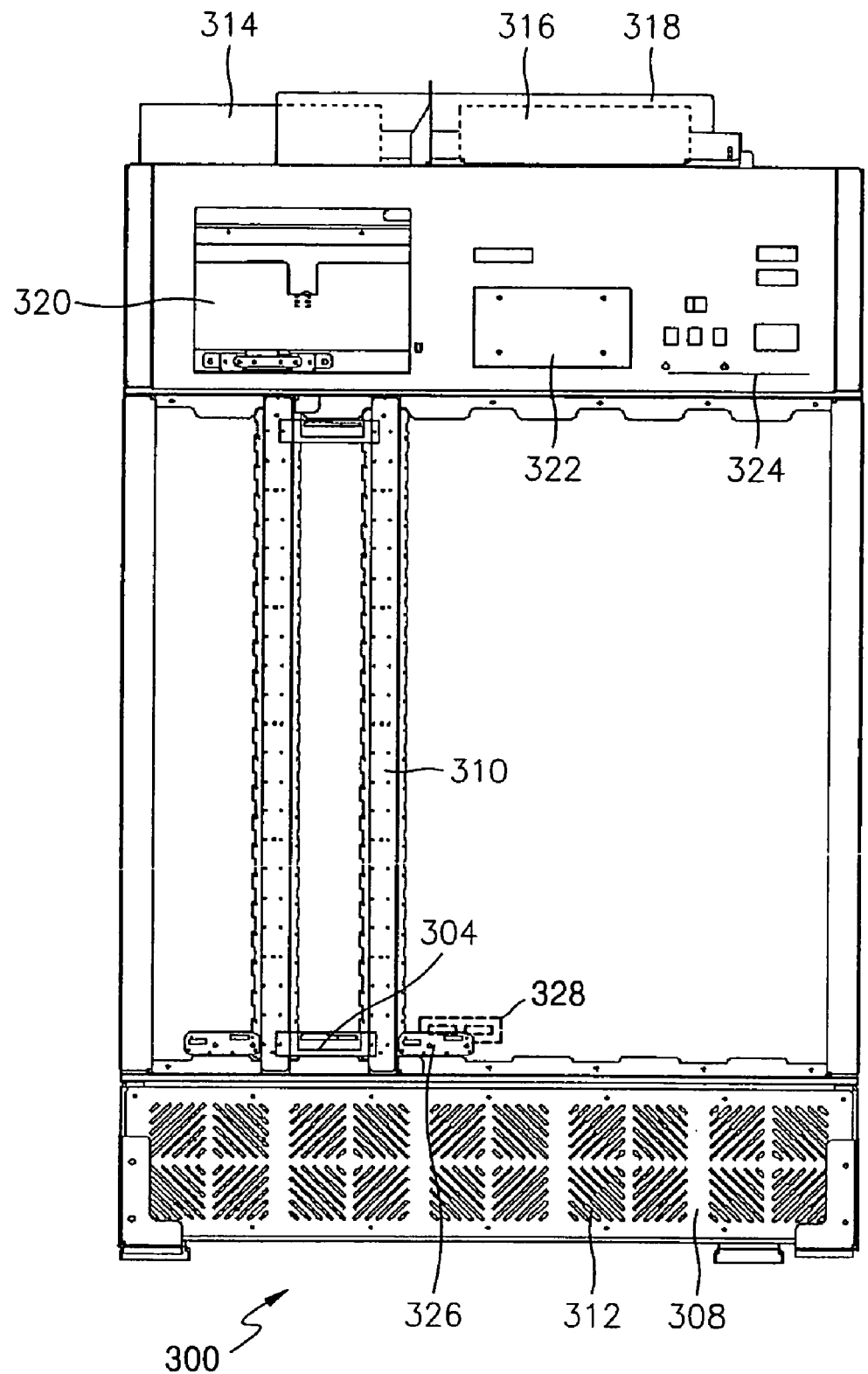

FIGS. 3 through 5 are perspective configuration views of a hard disk drive (HDD) testing apparatus used to test hard disk drives, according to an embodiment of the present invention. Referring to FIGS. 3 through 5, a HDD testing apparatus 300 comprises, in a center portion of the HDD testing apparatus 300, a burn-in chamber 302 where a plurality of HDDs can be stacked in a plurality of loading/unloading jigs 304 (only one loading/unloading jig 304 shown in drawings). LEDs on each loading/unloading jig 304 show a test status of the HDD loaded onto that loading/unloading jig 304. At the rear side of the center portion of the HDD testing apparatus 300, PCB interface boards 328 (shown in FIGS. 5 and 7) are installed, which have RS-232 transmitters/receivers communicably connecting the HDDs to the PCB interface boards 328 by converting an RS-232 signal, that is a test driver control signal, into an HDD TTL signal level and vice versa. The PCB interface boards 328 also have serial communication (RS-232) interface connectors to form a serial communication channel between the PCB interface boards 328 and a serial communication exchanger 316, and DC power supply connectors to connect to power cards 330 (shown in FIG. 7). The RS-232 signal lines, LED control signal lines, and power lines from an upper portion 306 and a lower portion 308 of the HDD testing apparatus 300 are connected to the corresponding interface connectors of each PCB interface board 328 along the rear of support ducts 310 (only one support duct 310 shown in drawings).

Typically, at the lower portion 308 of the HDD testing apparatus, an electricity board 334, a DC power supply 332 and the power cards 330 (all shown in FIG. 7) which control the supply of power to the HDDs and output a test driver status display LED control signal to the LEDs on the loading/unloading jigs 304, are installed inside a housing, and ventilation holes 312 are formed in the housing. A signal line of a host computer 314 which supplies a control signal for controlling the power cards 330 is connected to the power cards 330 through the serial communication exchanger 316 at the upper portion 306 of the testing apparatus 300, and LED control signal lines and power supply lines from the power cards 330 are connected to the LEDs on the loading/unloading jigs 304 and the PCB interface boards 328 in the burn-in chamber 302, respectively. According to an aspect of the invention, a control signal line of the host computer 314 is connected to a PCB interface board 328 of an HDD through the serial communication exchanger 316.

Typically, the host computer 314, the serial communication exchanger 316, a power controller 360 (shown in FIG. 7 in more detail) that comprises an electricity board 334, a DC power supply 332, and power cards 330, and a fan(s) 318 that keeps the temperature of the HDDs being tested substantially constant at room temperature by removing heat generated by the HDDs from the burn-in chamber 302, are located at the upper portion 306 of the testing apparatus 300. At the front of the upper portion 306, an interface unit 322 is installed, which, typically, comprises a display unit 320, and as input units, a keyboard, and a mouse, for an operator (user, control device) to interface with the host computer 314. Also located at the front of the upper portion 306 is a power display unit 324 that includes on/off switches for the DC power supplies, the host computer 314, and the fan(s) 318, and a power display window that displays the power status. Inside of the housing of the upper portion 306, another (upper) DC power supply 332, other power cards 330, and another electricity board 334 that supplies the operating signal to the upper DC power supply are installed. The inside of the upper portion 306 is much like the inside of the lower portion 308. In the burn-in chamber 302, the loading/unloading jigs 304 for loading/unloading the HDDs to be tested can be stacked lengthwise and widthwise (as the case may be) on the support ducts 310.

Figure 6:
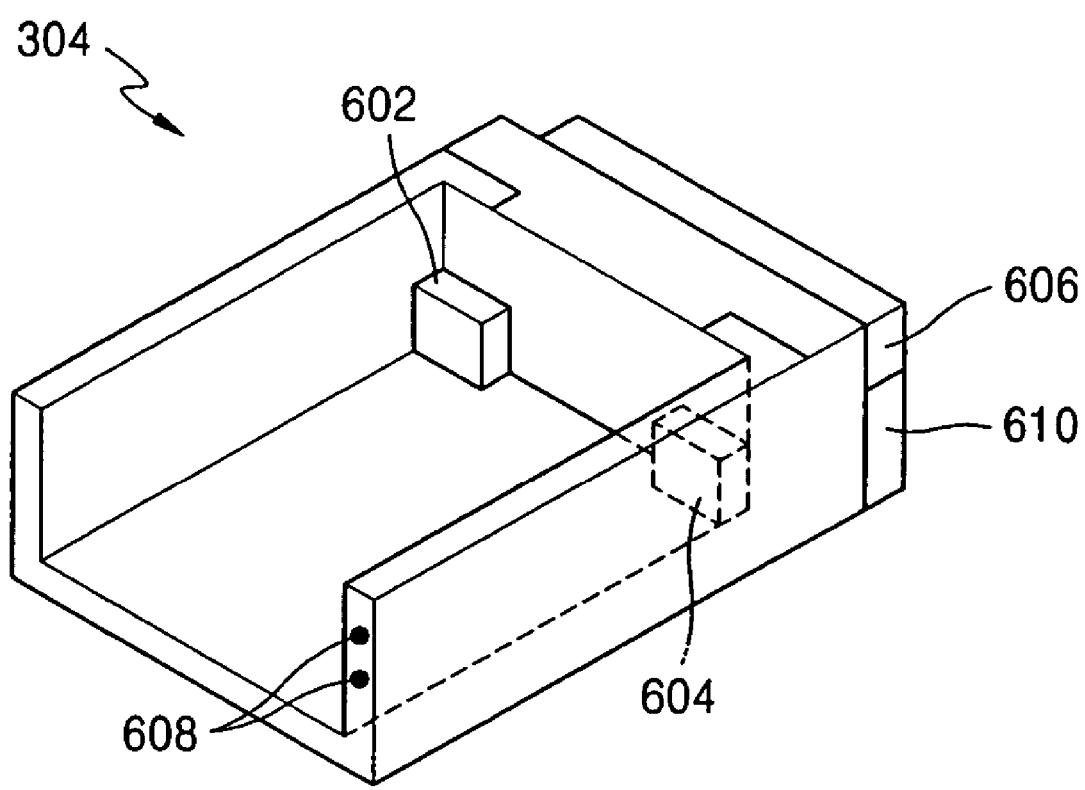
FIG. 6 is a perspective view of a loading/unloading jig shown in FIG. 3.

FIG. 6 is a perspective view of a lengthwise loading/unloading jig 304, according to an embodiment of the present invention. As shown in FIG. 6, pogo pins 602 and 604 which connect power pins and two universal asynchronous receiver transmitter (UART) pins of an HDD are located inside the loading/unloading jig 304, and a pogo pin connector 606 connected with the pogo pins 602 and 604 is located outside the loading/unloading jig 304. The loading/unloading jig 304 is disclosed in Korean Patent Publication No. 1999-70583 (Sep. 15, 1999), Korean Patent Publication No. 1998-31599 (Jul. 25, 1998), and Korean Patent Publication No. 1998-47465 (Sep. 15, 1998).

The pogo pin connector 606 is connected to a PCB interface board 328 passing through a separating bar 326 (see FIG. 5) located at the rear of the burn-in chamber 302. The PCB interface board 328 receives the control signal from the serial communication exchanger 316, converts the received control signal into a voltage level fitting an HDD (i.e., typically the TTL level signal), and supplies the converted received control signal to the pogo pin connector 606. In this way, the host computer 314 can communicate with the HDD.

With respect to the HDD testing apparatus 300 shown in FIG. 3, and the loading/unloading jig 304 shown in of FIG. 6, on a front (left) side of the loading/unloading jig 304, typically, two LEDs 608 are provided, each LED capable of emitting three different colors of light as a display of the status of the HDD placed in the loading/unloading jig 304. On the rear of the loading/unloading jig 304, an LED control signal line, which supplies a signal from the host computer 314 via a corresponding power card for controlling the two three-colored LEDs 608, is connected to a connector 610. In this way, the LEDs 608 are lighted corresponding to the test status of the HDD as determined by the host computer 314.

As described above, in each of the upper portion 306 and the lower portion 308 of the HDD testing apparatus 300, an electricity board 334 (shown in FIG. 7), a DC power supply 332 (shown in FIG. 7), and the power cards 330 are installed, which supply power to the HDDs and controls the LEDs 608. The electricity board 334 is configured to start operation when the host computer 314 is powered up, after main power is supplied to the HDD testing apparatus 300, and operates the DC power supply 332 upon receipt of a DC power-up instruction from the host computer 314 via the serial communication exchanger 316, and supplies a DC voltage level adjustment signal to the DC power supply 332. The power cards 330, a number of which typically corresponds to the number of HDDs that can be accommodated in the burning-chamber 302, are powered by the DC power supply 332, and then DC power is supplied to HDDs on each loading/unloading jig 304 via the power card 330.

The power card 330 judges whether an HDD is installed in a loading/unloading jig 304 by measuring a voltage through the power line connected to the PCB interface board 328 in the burn-in chamber 302, and also can measure the supplied DC voltage. Typically, the power card 330 is connected to the host computer 314 via the serial communication exchanger 316, and typically, sends information on the HDD loaded/unloaded status, the power supply status, and other information to the host computer 314, and executes instructions issued from the host computer 314 to control the LEDs 608 of the jig 304, and to turn on/off the supply of power to the HDD.

The host computer 314, which controls the entire HDD testing apparatus 300 and an HDD testing, controls each part of the apparatus 300 via the serial communication exchanger 316. According to an aspect of the present invention, the host computer 314 controls an HDD and a power card 330 with a serial communication signal via the serial communication exchanger 316 . Therefore, the serial communication exchanger 316 is in serial communication with the HDD, PCB interface boards 328 and the power cards 330. In particular, to communicably connect the host computer 314 and the HDD with the serial communication signal via the serial communication exchanger 316, a voltage level of the serial communication signal is changed when transmitting the serial communication signal from the serial communication exchanger 316 to the HDD via a PCB interface board 328, because typically the voltage levels used in the serial communication exchanger 316 and the TTL signal in the HDD are different. Meanwhile, the power card 330 controls the LEDs 608 installed in the loading/unloading jig 304 of the HDD in response to the control signal from the host computer 314. That is, signals transmitted to the PCB interface board 328 are comprised of control signals from the host computer 314 and LED control signals from the power card 330.

The display unit 320 on the front of the upper portion 306 of the HDD testing apparatus 300 is also connected to the host computer 314. Information enabling an operator to monitor the status of each test HDD is displayed on the display unit 320. The operator can execute a host program or a specified function of the host program via the interface unit 322, for example, a keyboard and mouse.

On the power display unit 324, typically, a master power button which can turn on/off power to the entire HDD testing apparatus 300, a power button which turns the host computer 314 on/off, a power button which turns the DC power supplies installed in the upper portion 306 and in the lower portion 308 on/off, and a power button which turns the fan 318 on/off, are installed. Also, the status of power being supplied can be immediately confirmed through a window of the power display unit 324. The fan 318 dissipates heat generated by operation of the HDDs out of the HDD testing apparatus 300.

Figure 7:
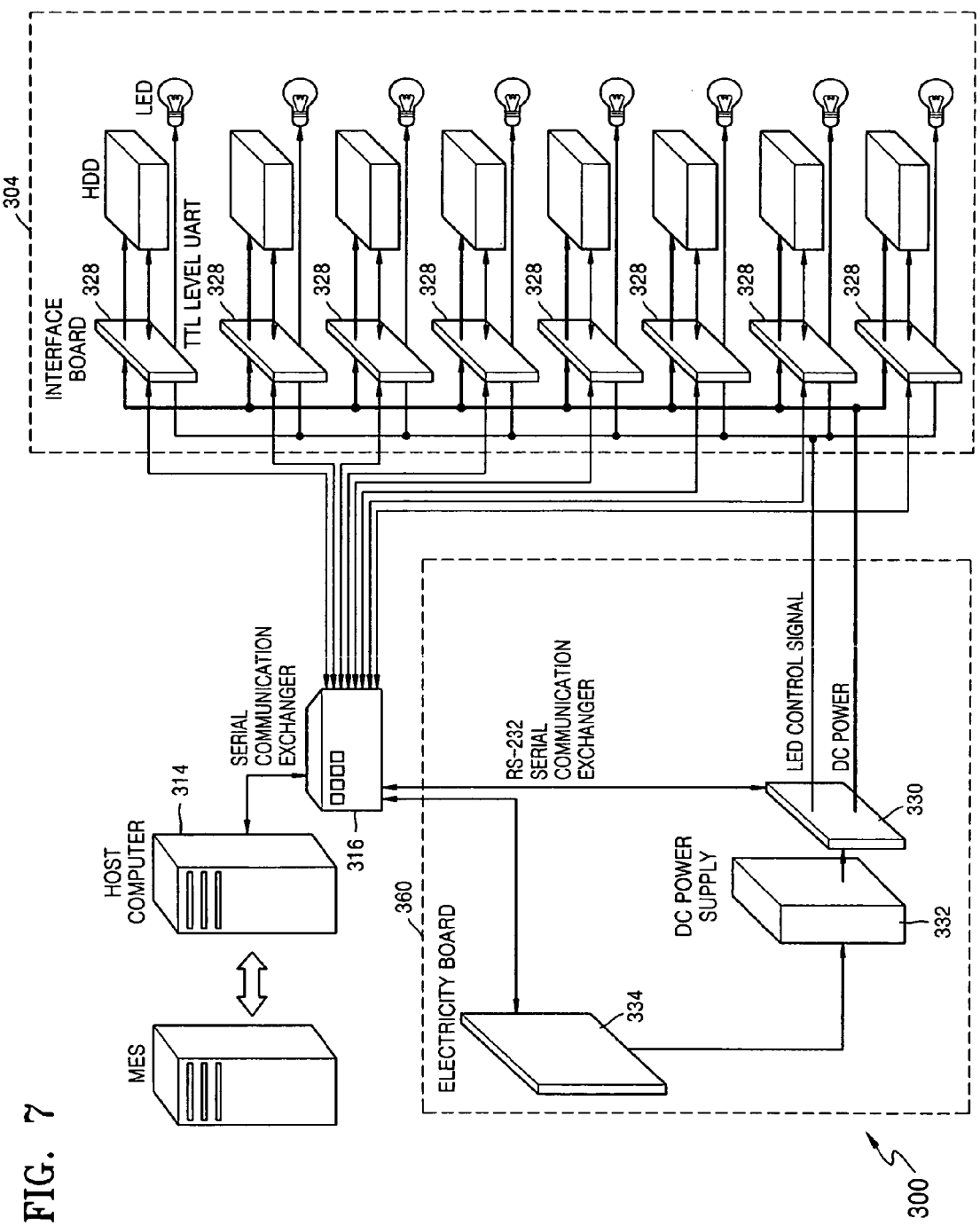
FIG. 7 is a diagram of the internal/external functional configuration and operation of the hard disk drive testing apparatus shown in FIG. 3 in more detail, according to an embodiment of the present invention.

FIG. 7 is a diagram schematically showing in more detail the internal/external functional configuration and operation of the HDD testing apparatus shown in FIG. 3, according to an embodiment of the present invention. The host computer 314 communicates with a process history data base (MES) via a network, and is communicably connected, via the serial communication exchanger 316, with a plurality of HDDs; an electricity board 334, and a plurality of power cards 330, each power card 330 controlling power and LED signals to a number of HDDs as determined by implementation environment, such as software/hardware constraints. In other words, typically, a maximum number of HDDs to be controlled varies according to software and not limited. According to an aspect of the invention, the serial communication exchanger 316 is communicably connectable to a power controller 360 and plurality of serial communication lines and control lines connectable to a plurality of loading/unloading jig(s) 304. In particular, the power controller 360 comprises the electricity board 334, the power cards 330, and the DC power supply 332. In FIG. 7, the host computer 314 is a standard computer and the serial communication exchanger 316 is a peripheral devices of the standard computer 314 that interfaces via serial communication the standard computer 314 with a plurality of HDDs for testing the HDDs. According to an aspect of the present invention as shown in FIGS. 3–5 and 7, the host computer 314, the serial communication exchanger 316, and the HDDs are all provided in one body in which the serial communication exchanger 316 interfaces via serial communication the standard computer 314 with a plurality of HDDs for testing the HDDs, however, the present invention is not limited to such an implementation configuration. Although in the above-described FIG. 7 example embodiment, the power controller 360 is implemented as a separate element from the serial communication exchanger 316 and communicably connectable with the serial communication exchanger 316, the present invention is not limited to such a configuration, and the power controller 360 may be configured to be part of the serial communication exchanger 316.

First, when the host computer 314 is booted, the host computer 314 executes the host program for testing the HDDs. The host computer 314 issues a DC power supply instruction to the electricity board 334 via the serial communication exchanger 316 according to the host program. When the DC power supply 332 starts to supply power under the control of the electricity board 334, the power cards 330 are operated, and the host computer 314 continuously checks the loaded/unloaded status of HDDs on the loading/unloading jigs 304 via each power card 330. The power cards 330 check the loaded/unloaded status of the HDDs, typically, by detecting a voltage drop in the power line connected to each HDD.

According to the FIG. 7 example, each power card 330 controls the supply of DC power to each of 8 PCB interface boards 328 for 8 HDDs, under the control of the host computer 314, and also controls the LEDs 608 of the loading/unloading jigs 304. If a power card 330 recognizes that a new HDD is loaded onto a loading/unloading jig 304, the host computer 314 immediately starts to communicate with the installed HDD via a serial communication channel established among host computer 314, the serial communication exchanger 316 and a PCB interface board 328 of the installed HDD. The host computer 314 gets driver information, for example, the interface standard, the model name, and the version information, from the HDD, transfers the driver information to the MES, downloads a test script and a test code appropriate for the HDD from the MES, transfers the test script and test code to the HDD, and starts testing the HDD.

For the installed HDD, the host computer 314 displays the test status through the display unit 320, issues instructions to the power card 330 to control lightening the LEDs 608 on the loading/unloading jig 304. More particularly, when the HDD sends the test results to the host computer 314 after testing is completed, the host computer 314 issues instructions to the power card 330 to cut off the supply of power to the HDD, displays the test results through the display unit 320 and the LEDs 608 of the loading/unloading jig 304, and also transfers the test results to the MES. In the HDD testing apparatus 300 illustrated in FIGS. 3 through 7, for example, if one power card 330 can handle 8 HDDs, in a case of using 18 power cards 330, then one host computer 314 can concurrently test up to 144 HDDs by directly controlling the 144 HDDs, the electricity board 334, and the 18 power cards 330, through establishment of a serial communication channel via the serial communication ports COM1 and COM2 of the host computer 314, among the host computer 314, the serial communication exchanger 316, the PCB interface boards 328 of the HDDs and the UART ports of the HDDs.

Figure 8:
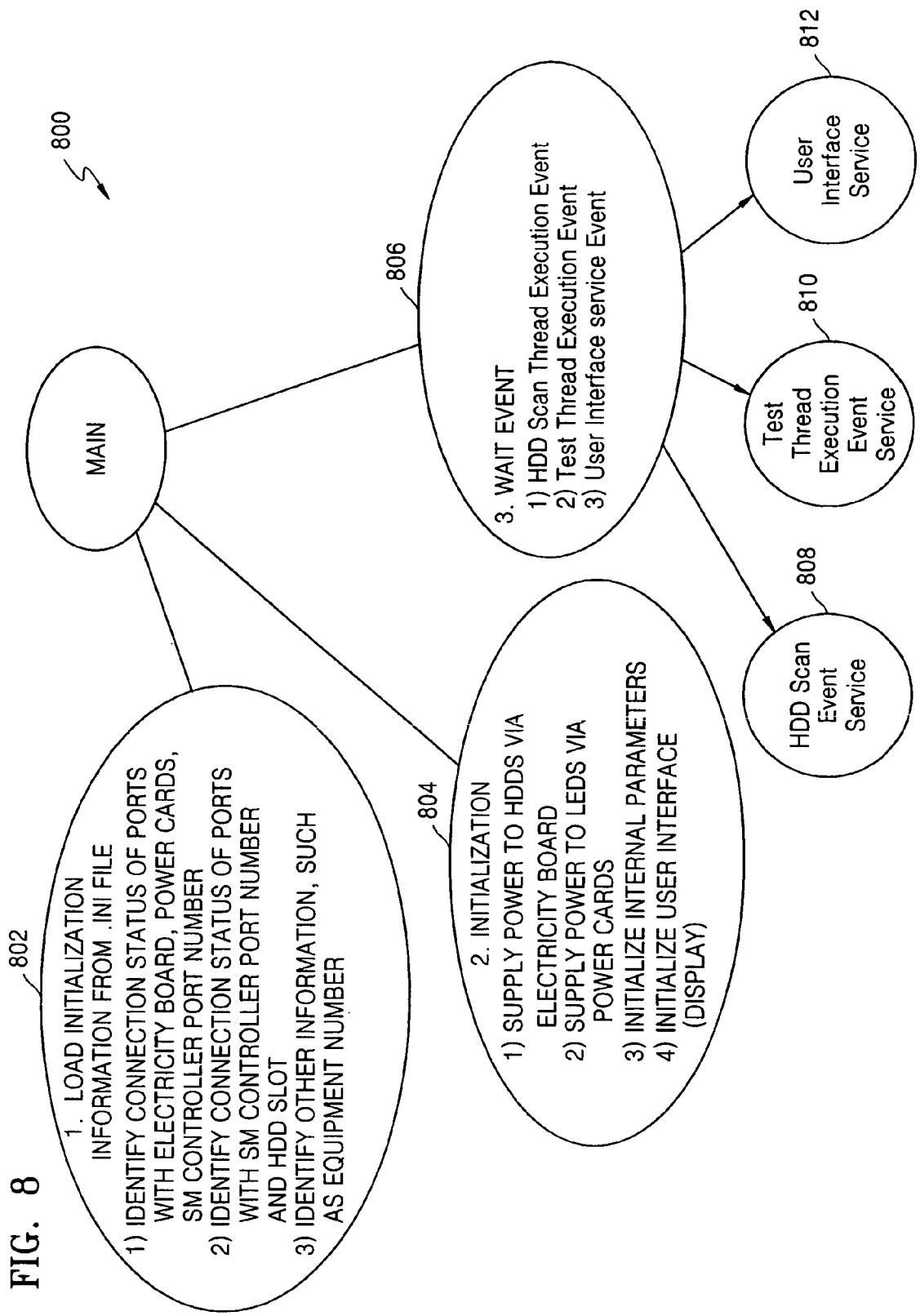
FIG. 8 is a flow chart of testing hard disk drives, according to an embodiment of the present invention.

FIG. 8 is a flow chart of a method of testing hard disk drives, according to an embodiment of the present invention. A computer program 800 testing HDDs is run by a hard disk drive testing apparatus, for example, by the host computer 314 of the HDD testing apparatus 300. However, the present invention is not limited to operating/controlling the HDD testing apparatus 300, and can be implemented to operate/control any hard disk drive testing apparatus with loadable and unloadable hard disk drives. In this example, the host computer 314 can test a plurality of HDDs using two serial communication ports COM1 and COM2 of the host computer 314. For example, one serial communication port COM2 allows the host computer 314 to communicate via a serial communication channel as a data path with the HDDs, and the other serial communication port COM1 as a routing control path allows the host computer 314 to control the serial communication exchanger 316 for establishing the serial communication channel data path between the plurality of HDDs and the serial communication port COM2 of the host computer 314.

As illustrated in FIG. 8, the HDD test program 800 may include a initialization information loading module 802, an initialization module 804, an event wait module 806, an HDD scan event service module 808, a test thread execution event service module 810, and a user interface service module 812, performing processes of the present invention. Typically, the initialization information loading module 802 reads an initialization file with an extension, for example, 'ini', to identify the connection status between each of the electricity board 334, the power cards 330 and the serial communication exchanger 316 via each port thereof, the connection status between each of the serial communication exchanger 316 serial ports and each hard disk slot (i.e., the PCB interface board 328), and equipment number, etc.

The initialization module 804, typically, supplies power to the HDDs via the electricity board 334 to the DC power supply 332, which supplies power to the power cards 300, which supply power to the HDDs and control the LEDs 608 of the loading/unloading jig 304 to inform an operator of the status of an HDD. The initialization module 804 also initializes internal parameters and initializes a user interface (display).

The event wait module 806 waits an occurrence of an event, for example, an HDD scan thread execution event, a test thread execution event, a user interface service event, an HDD scanning thread execution start event, a test thread execution start event, etc., and calls a corresponding service module for the event that has occurred, such as the HDD scan event service 808, the test thread execution event service 810, and the user interface service 812. When a test thread execution event occurs, a newly created test thread execution event service 810 is allocated to a HDD (port) to be tested (i.e., the test service software module 810 communicates with the test HDD via the serial communication channel established between the host computer 314 and the HDD serial port via the host computer serial port, the serial communication exchanger 316 serial input port and one of the serial output ports, the PCB interface board 328 and the test HDD UART port).

The HDD scan thread execution event is an interrupt occurring with a first period, and the test thread execution event is an interrupt occurring with a second period, wherein the first period is shorter than the second period. The first period regarding the HDD scan thread execution event may be 50 ms, and the second period regarding the test thread execution event may be 100 ms. The user interface service event occurs non-periodically by an operator's test start instruction or a test thread. More particularly, for example, the test thread could create a user interface service event, in case of presenting test results of a loaded HDD to the user via a user interface.

The HDD scan event service module 808, which is called when an HDD scan thread execution event has occurred, checks whether an HDD has loaded. The test thread execution event service module 810, which is called when a test thread execution event occurs, checks the status of an HDD while communicating with the HDD via the established serial communication channel therebetween and performs a burn-in (B/I) test. The user interface service module 812, which is called when a user interface service event has occurred, informs a user of the proceeding status of the HDD test to allow a user operation and informs the MES of the HDD test results to allow management of the HDD test results.

As an example, the present invention's method of testing the HDDs in the HDD testing apparatus 300 will be described with reference to FIGS. 8–13. As the host computer 314 is booted and the HDD test program 800 is executed, the connection status of the HDD testing apparatus 300 is checked by the initialization information loading module 802, the DC power supply 332 connected to the power cards 330 is initialized via the electricity board 334 by the initialization module 804. More particularly, as the serial communication exchanger 316 is informed of the ID number of the port that is connected to the electricity board 334, the serial communication exchanger 316 connects the serial communication port COM1 of the host computer 314 to a communication port of the electricity board 334. Then, the electricity board 334 initializes the DC power supply 332 connected to the power cards 330. Next, the DC power supply 332 applies DC power, which is required for operating the HDDs, to each of the power cards 330.

In the last initialization operation, communication channels between the electricity board 334 and 18 power cards 330 are established, and the power cards 330 initialize the LEDs 608 of the loading/unloading jigs 304 connected to the power cards 330. Next, an operator inserts an HDD into a loading/unloading jig 304 with the LEDs 608 indicating a ready-to-test status. When for the first time the operator installs HDDs into the loading/unloading jigs 304 in the burn-in chamber 302 and pushes, for example, via the interface unit 322, a test start button at a user interface presented by the HDD test program 800 on a display unit, such as the display unit 320 (i.e., a test start command is input), the event wait module 806 of the HDD test program 800 recognizes an occurrence of a test start event as a user interface service event. After the recognition of the test start event, the HDD scan event service module 808 of the HDD test program 800 checks (monitors) the loading/unloading of HDDs. More particularly, the power cards 330 store information on the loading/unloading of the HDDs to which power is supplied therefrom and provides this loading/unloading information to the HDD test program 800, if there is a request from the HDD scan event service module 808 of the HDD test program 800. Next, the test thread execution event service module 810 of the HDD test program 800 tests the individual loaded HDDs.

In the present example, the host computer 314 tests the HDDs, which are connected to the host computer 314 through the serial communication port COM2, as the data path, of the host computer 314, and the input and output serial communication ports of the serial communication exchanger 316, in priority order using the HDD test program 800. The HDD test program 800 includes information on the test status of each of the HDDs. The test status of each of the HDDs is displayed on the display unit 320 by a display update thread, and the test results are transmitted to the MES.

Figure 9:
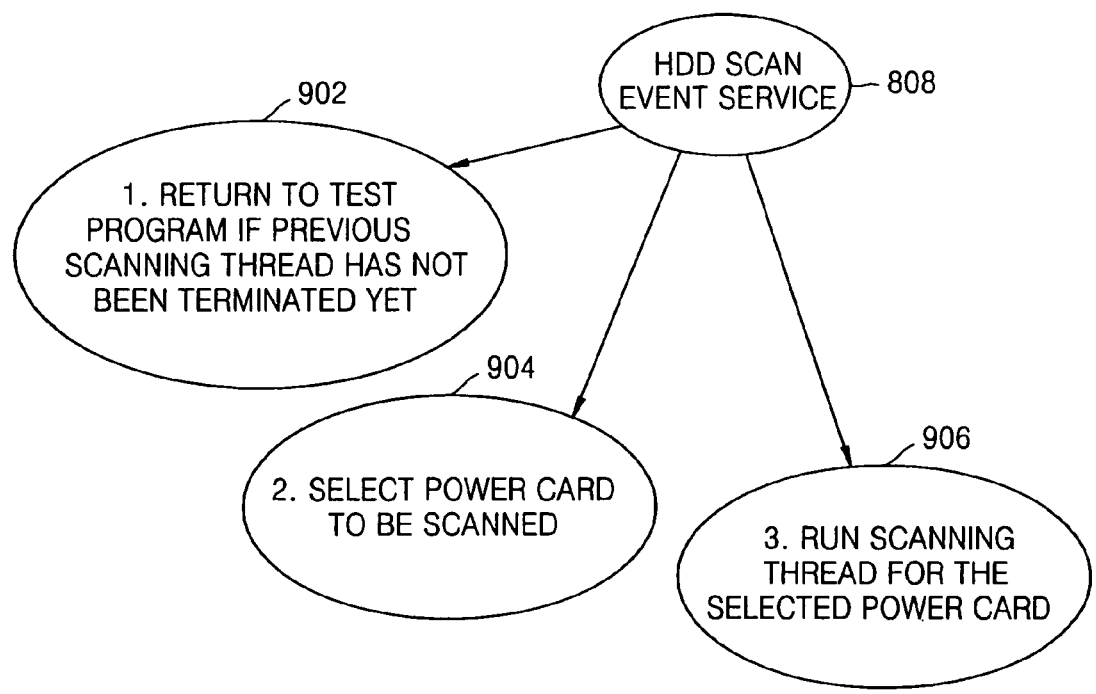
FIG. 9 is a flow chart of a hard disk drive (HDD) scan event service in the hard disk drive testing method in FIG. 8.

FIG. 9 is a flow chart of the HDD scan event service module 808 in FIG. 8. At operation 902, the HDD scan event service module 808 checks whether the operation of a pervious HDD scanning thread has been terminated. The scan event service module 808 returns to the HDD test program 800, if, at operation 902, the previous HDD scanning thread has not been terminated yet. If, at operation 902, the operation of the previous HDD scanning thread has been terminated, at operation 904, a next power card 330 to be scanned is selected. Therefore, sequentially a next one of the power cards 330 is selected whenever an HDD scan thread execution event occurs, and, at operation 906, an HDD scanning thread scans the power card 330 selected. Typically, the HDD scan thread execution event is a periodic interrupt that occurs, for example, every 50 ms. Therefore, when an HDD scan thread execution event occurs, the HDD scan event service 808 reads/receives according to the HDD scanning thread 906, information stored in one of the power cards 330 to check the loading/unloading of an HDD.

Figure 10:
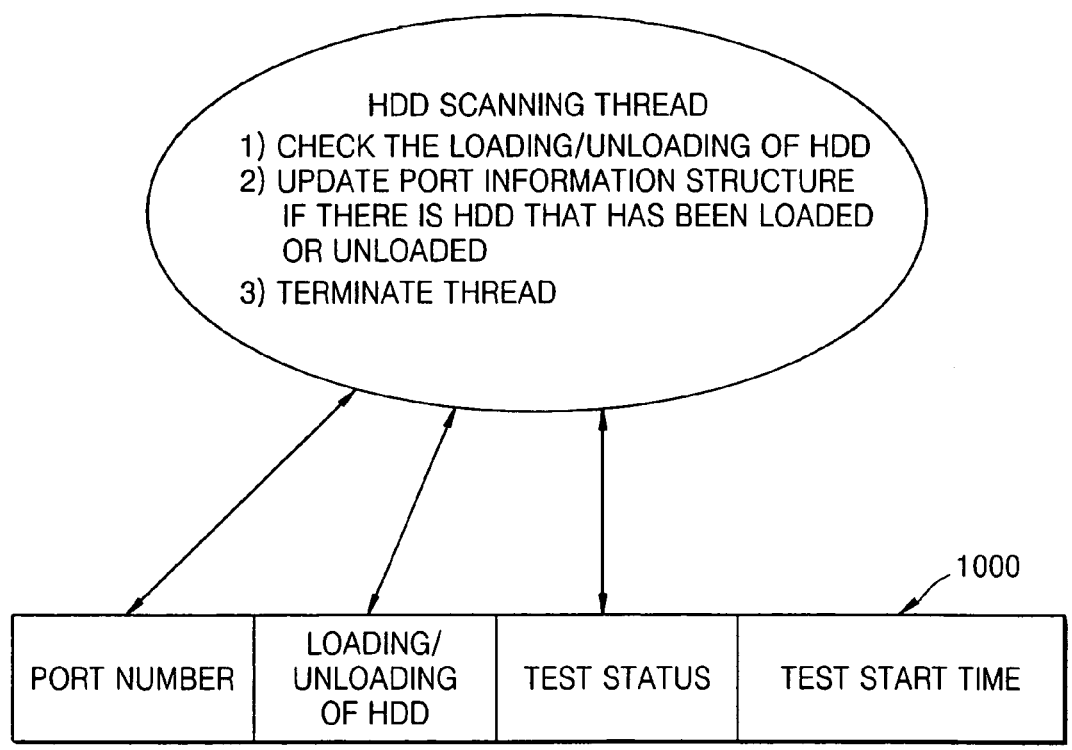
FIG. 10 is a flow chart of an HDD scanning thread in FIG. 9.

FIG. 10 is a flow chart of the HDD scanning thread 906 in FIG. 9. In particular, first, the HDD scanning thread determines whether an HDD has been loaded using the power cards 330. Second, if it is determined that an HDD has been loaded or unloaded, a port information data structure 1000 is updated (or created, as the case may be). The port information data structure 1000 stores information on a port number, the loading/unloading of HDDs corresponding to that port number, test status, test start time, etc. This port information data structure 1000 is referred to/input by test threads, which will be described in more detail below. Third, the HDD scanning thread is terminated.

Figure 11:
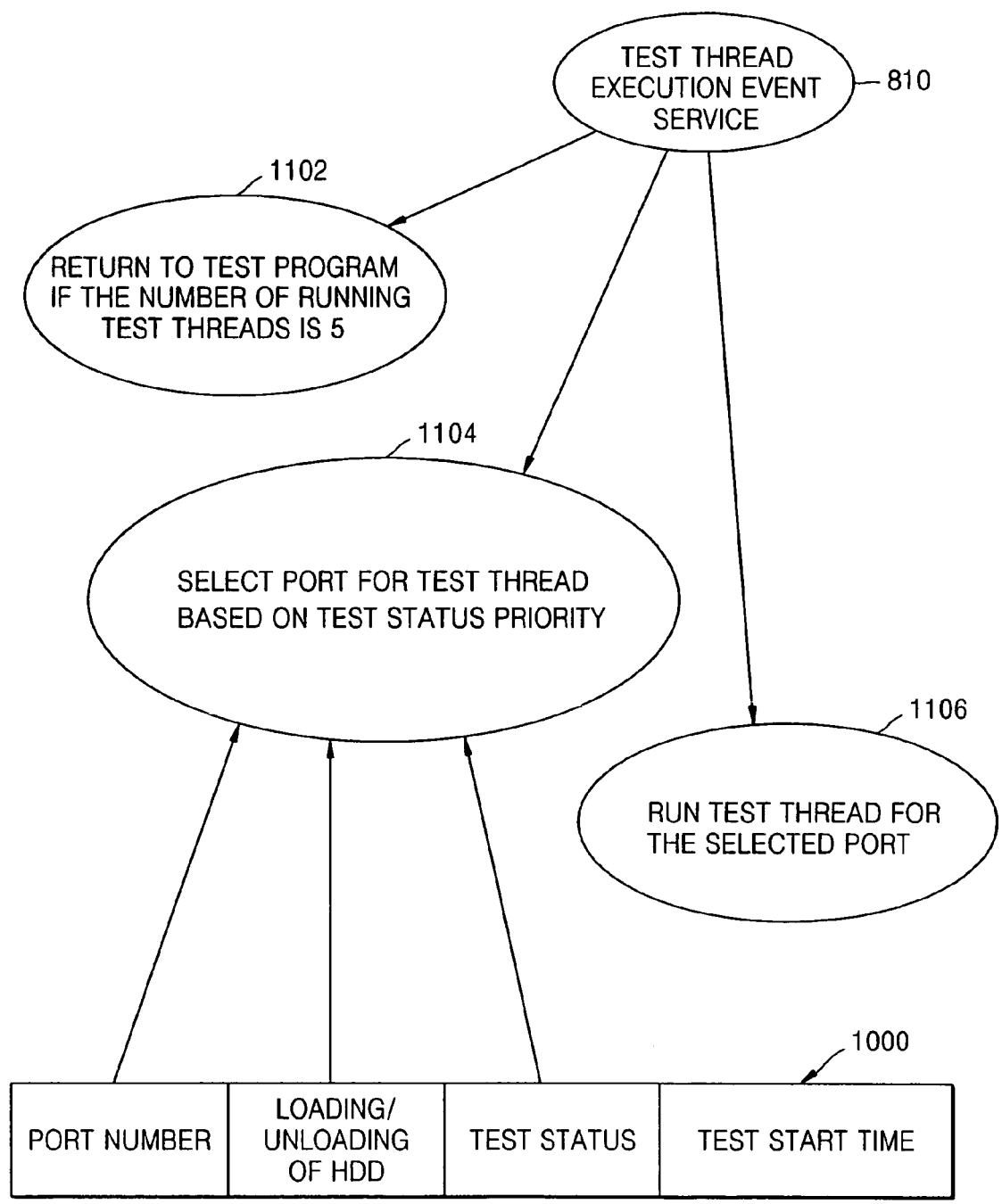
FIG. 11 is a flow chart of a test thread execution event service in FIG. 8.

FIG. 11 is flow chart of the test thread execution event service module 810 in FIG. 8. When a test thread execution event occurs, at operation 1102, the test thread execution event service module 810 checks whether the number of test threads that are running is equal to 'n'. If, at operation 1102, the number of the running test threads is equal to 'n', the test thread execution event service modules 810 returns to the HDD test program 800. More particularly, in operation 1102, 'n' is the maximum number of test threads that are allowed to run concurrently and varies depending on the resources of the host computer 314, required test time, etc. It should be noticed that the number of test threads that are allowed to run concurrently does not equal the number of HDDs under test, because the test threads do not engage in any operation in the HDDs after a testing job on the HDDs has been terminated, and accordingly the corresponding test thread is terminated (as will be described in more detail further below). According to an aspect of the present invention, the test thread execution event may occur with a period of 100 ms. The maximum number of concurrently running test threads, which is denoted by 'n', for example, may be 5, such that up to five test threads may run concurrently.

If, at operation 1102, the number of the test threads that are running is less than 'n', a serial port for a new test thread is selected (i.e., a serial port in the present invention refers to an established serial communication channel selected among one host computer 314, the serial communication exchanger 316, the PCB interface boards 328 and the HDDs UARTs), and, at operation 1104, it is determined whether there is a serial port with a higher priority test status than the selected serial port. These serial ports are connected to the HDDs and are managed by their serial numbers. The host computer 314 tests the HDDs while communicating with the HDDs through the COM2, as the data path, of the host computer 314 and the plurality of HDD serial ports communicably connected to the HDDs by the output serial ports of the serial communication exchanger 316. The serial ports (referred to as 'port' herein) connected to the HDDs are allocated one by one to new test threads such that the port serial numbers are ordered. More particularly, at operation 1104, the test thread event service module 810 checks whether there is a port with a higher priority test status than the test status of the port allocated to the new test thread with reference to the port information data structure 1000 (i.e., there is an HDD port on which an HDD test job is being executed or to be executed that has a higher execution priority than a test job to be performed in the port occupied by the new test thread). Ports that are subjected to this priority comparison include all of the existing waiting ports, including ports occupied by other test threads, excluding the port occupied by the new test thread.

If, at operation 1104, there is a port with a higher priority than the port allocated to the new test thread, the test thread execution event service module 810 terminates the current test thread to preferentially allocate another new test thread to the higher priority port for testing the HDD connected to the higher priority port. Therefore, ports are allocated by the test thread execution event service 810 to new test threads one by one such that the port serial numbers are ordered, and the HDDs connected to the ports are tested in the order of port serial numbers.

When, at operation 1104, there is no port with a higher priority than the port allocated to the current test thread, at operation 1106, a test thread runs to get a list of jobs to be performed on a corresponding HDD with reference to the port information data structure. A test thread, at operation 1104, executes until one job from the list of jobs on the HDD terminates (i.e., the test thread performs/executes one job at a time). Once test job is completed, before termination, the test thread inputs/updates a test status in the port information data structure 1000, which indicates an HDD test stage according to a job execution order of HDD test jobs for the loaded HDD port. Therefore, each HDD test stage corresponds to a completed HDD test job for the loaded HDD. The HDD is tested through a plurality of sequential jobs, examples of which are listed in Table 1 below.

TABLE 1

| Execution Order | Job | Priority Rank |
|---|---|---|
| 1 | Power On | 3 |
| 2 | Reset | 1 |
| 3 | HDD Identification | 3 |
| 4 | Model Name Identification | 2 |
| 5 | B/I Script and Code Download | 3 |
| 6 | Power Off-On | 3 |
| 7 | Test Results Monitoring | 4 |
| 8 | Power Off | 3 |

The execution order in the left column of Table 1 represents the order in which the jobs are performed. The priority orders in the right column of Table 1 represent the execution priority of each job. Each of the jobs performed by or responsible for by a test thread will be described in detail as follows.

Power On

1) A power-on command for the HDD connected to the selected port is input to the power card 330.

2) The test start time is recorded in the port information data structure 1000. Typically, the port information data structure 1000 also comprises HDD test information on that port or a link to an HDD test information data structure for that port. Typically, the HDD test information data structure includes HDD serial number, model information, coding information, test status information, capacity information, test results, test time, etc. This HDD test information data structure is referred to when transmitting the test results to the MES .

3) A command to turn the LEDs of the loading/unloading jig 304 on to indicate a start of a test is input to the power card 330.

4) The status information in the port information data structure 1000 is updated.

5) A display update event is induced, and the test thread is terminated.

2. Reset

1) A reset command is input to the HDD.

2) It is checked whether the HDD is ready for testing.

3) The status information in the port information data structure 1000 is updated.

4) A display update event is induced, and the test thread is terminated.

3. HDD Identification

1) Coding information on the HDD is received and stored in the HDD test information data structure.

2) The status information in the port information data structure 1000 is updated.

3) A display update event is induced, and the test thread is terminated.

4. Model Name Identification

1) The model name of the HDD is identified based on the coding information stored in the HDD test information data structure and is provided to the MES . The model name of the HDD is referred to when downloading B/I scripts and codes from the MES .

2) The identified information is stored in the HDD test information data structure.

3) The status information in the port information data structure 1000 is updated.

4) A display update event is induced, and the test thread is terminated.

5. B/I script and Code Download

1) B/I scripts and codes according to the HDD test information are downloaded to the HDD.

2) The status information in the port information data structure 1000 is updated.

3) A display update event is induced, and the test thread is terminated.

6. Power Off-On

1) The HDD to which the codes have been downloaded is rebooted to initiate testing.

2) The status information in the port information data structure 1000 is updated.

3) A display update event is induced, and the test thread is terminated.

7. Test Results Monitoring

1) It is monitored whether the results of testing the HDD is reported.

2) After testing the HDD is terminated, the test results are stored in the HDD test information data structure and are reported to the MES .

3) The status information in the port information data structure 1000 is updated.

4) A display update event is induced, and the test thread is terminated.

8. Power Off

1) A power-off command for the HDD connected to the selected port is input to the power card 330, and the test thread is terminated.

In testing the HDD, from the end of the sixth job, i.e., the power off-on operation, to the end of the seventh job, i.e., monitoring the test results, job operations are performed in the HDD independent of the host computer 314. A process performed in an HDD using the downloaded scripts and codes is disclosed in detail in Korean Laid-open Patent Publication No. 1997-7634 (Feb. 21, 1997), filed by the same applicant as the prevent invention.

The priority rank in Table 1 above is the priority rank of the job operations to give priority to the HDD that is performing a higher priory job operation when there are a plurality of HDDs under test. Typically, a more time-consuming job operation has a higher priority. For example, the reset operation and the operation of identifying the model name of an HDD, which take larger amounts of time than the other operations, have higher priorities. Although in the above-described embodiment the priority is according job time consumption, the present invention is not limited to such a configuration and the present invention can process jobs according to any prioritization criteria, such as for example, next job wait time, other importance criteria, HDD test result, or the execution order, etc.

Figure 12:
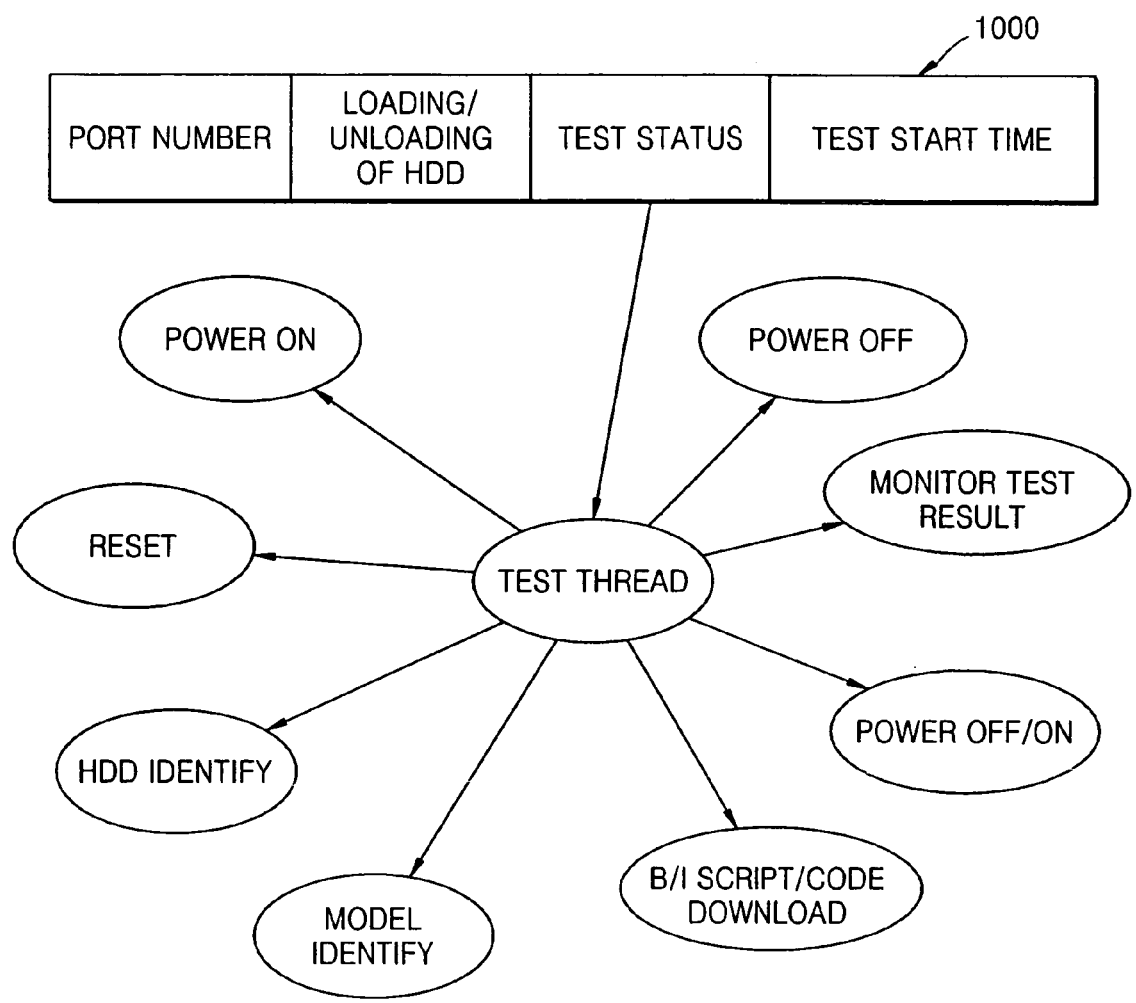
FIG. 12 is a flow chart of job operations performed by a test thread in FIG. 11.

FIG. 12 is a flow chart of job operations performed in a test thread 1106 in FIG. 11. Each test thread, at operation 1104, is allowed to perform any of the job operations (8 jobs in this example) involved in HDD testing, as listed in Table 1 and illustrated in FIG. 12, but one by one upon request. Therefore, a series of job operations according to a job execution order that are involved in testing HDDs and according to a job execution priority order (as listed in Table 1), can be efficiently performed by concurrently run test threads. As shown in FIG. 12, each test thread updates the test status information in the port information data structure 1000 of an HDD port according to the execution order of the jobs, before terminating each job operation by terminating the thread, thereby allowing another test thread to refer to the updated test status information for that HDD port and continue with the next job in the execution order and according to the execution priority order of the jobs in the occupied ports.

Figure 13:
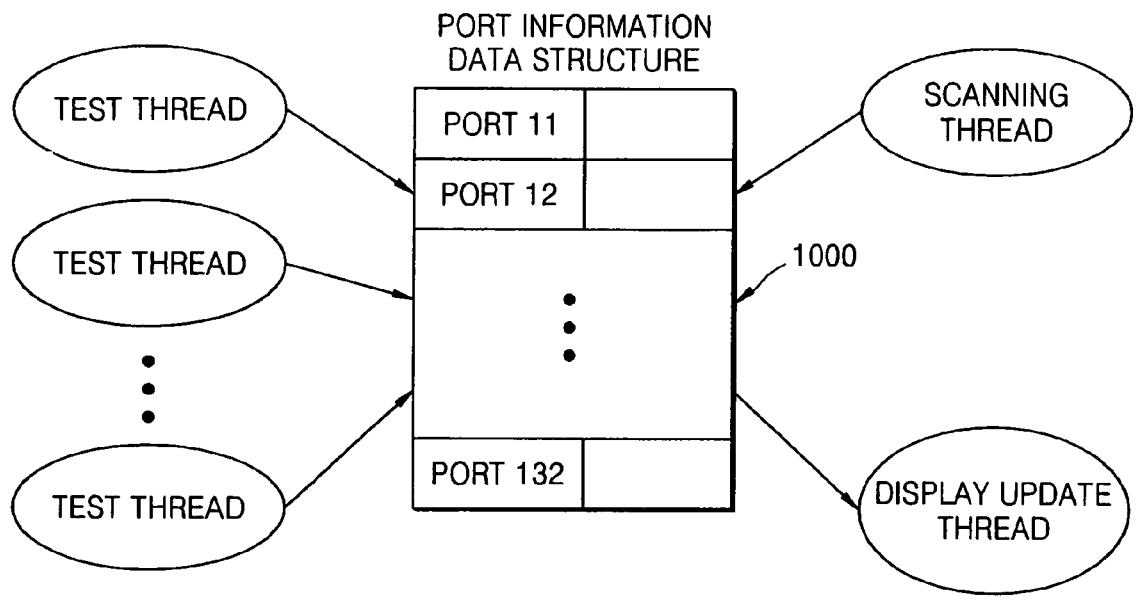
FIG. 13 is a diagram of relationships between a port information data structure, a HDD scanning thread, test threads, and a display update thread.

FIG. 13 is a diagram of relationships between the port information data structure 1000, test threads, a HDD scanning thread, and a display updating thread. The port information data structure 1000, including the HDD test information data structure, stores various kinds of information regarding the test status of each of the HDDs connected to the ports and is referred to by the HDD scanning thread, the test threads, and the display updating thread, to determine loading/unloading of a disk on a particular port, the HDD test job status on that port, and to update the HDD test job status information for that port on a displayed user interface. The port information data structure 1000 has a format as illustrated in FIG. 10 and stores information on port number, the loading/unloading of an HDD, test status, test start time, etc.

The HDD scanning thread updates information in the port information data structure 1000 as to whether an HDD has been loaded or unloaded on an HDD port. The HDD scanning thread, which runs whenever a HDD scanning thread execution event occurs, checks on which port an HDD has been loaded with sequential reference to the power cards and updates the information on the loading/unloading of an HDD in the port information data structure 1000 based on the results. Each test thread updates the test status information in the port information data structure 1000 according an HDD test job completion on that HDD port. Each test thread also stores in the port information data structure 1000 test start time information, i.e., the information on the time at which testing on an HDD starts, and HDD test result information. The port information data structure 1000 is referred to by the display updating thread to display the test status and test results of each of the loaded HDDs on the display unit, such as a monitor, for the operator.

Figure 14:
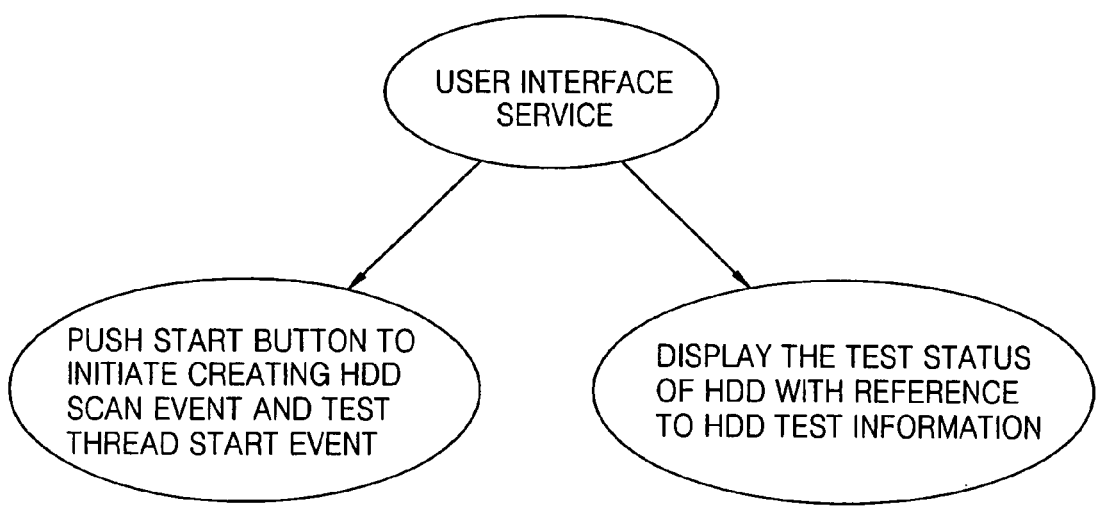
FIG. 14 is a flow chart of an operation of a user interface service module in FIG. 8.

FIG. 14 is a flow chart of the user interface service module 812 in FIG. 8. The user interface service module 812 is called when a user interface service event occurs. As described above, the user interface service event is triggered by inputting a start button (i.e., input command) or by a test thread. For example, when the start button is pushed, the user interface service module 812 triggers an HDD scanning start event and a test thread start event. The HDD scanning start event and the test thread start event periodically trigger an HDD scanning thread execution event and a test thread execution event, respectively.

The display updating thread is called by the user interface service module 812. The user interface service module 812 informs a user of the test status of the HDD through the display unit 320 with reference to the port information data structure 1000. The user interface service module 812 may also provide the test results to the MES and/or to a user interface on the display unit 320. Advantageously, the port information data structure 1000, including the HDD test information data structure, allow recording HDD test results according to an HDD port and HDDs, via the HDD serial number, loaded and tested on that HDD port.

In an HDD testing method according to the present invention, up to 'n' test threads may run simultaneously. The 'n' test threads communicate with each other and are synchronized with each other for efficient use of communication resources, i.e., communication channels, rather compete with each other to occupy the communication channels. To this end, window-based mutex objects may be used. Mutex objects, which are a kind of kernel objects, are used to acquire as many resources as those required to perform a minimum number of processes and enable a plurality of threads to communicate with each other. Therefore, the present invention provides an HDD testing method optimized for testing multiple HDDs at the same time and which improves productivity. As the capacity of HDDs increase, leading to more time consumption for testing and requiring enlargement of test equipment, the HDD testing method according to the present invention provides a great cost saving effect.

The processes of the present invention as embodied in the above-described modules of FIGS. 8–14, are implement in software and/or computing hardware (as the case may be). Therefore, the present invention provides a method of testing a plurality of hard disk drives in response to a random request by checking whether hard disk drive have been loaded, and sequentially allocating one test thread for each loaded hard disk drive. Each allocated thread performs a series of test job operations one by one when called and required for testing the loaded hard disk drive, and records a test status of each hard disk drive whenever one job operation of the test by one of the test threads is terminated to allow a next test thread to refer to the recorded test status to continue with a next job operation of the test. Each hard disk drive is tested according to a time required to test that hard disk drive. More particularly, the present invention is not limited to testing hard disk drives and can be used to test a plurality of devices via serial ports of the devices, and therefore present invention provides a method, comprising performing by a test thread a plurality of jobs one by one according to a recorded completion status of each job to test a loaded device; and allocating to each loaded hard disc drive of a plurality of loaded devices, via a serial communication interface to each loaded device, one test thread per each job of the plurality of jobs to test each loaded device, according to the test threads job completion status recordings of each loaded device.

Further, an apparatus performing the processes of the present invention may achieve the present invention. For example, the present invention provides a hard disk drive (HDD) testing apparatus, comprising a plurality of loadable and unloadable HDDs; and a single host computer comprising a programmed computer processor controlling the single host computer according to a process comprising selectively establishing communication channels between the single host computer and each HDD, performing by a test software thread a plurality of jobs one by one according to a recorded completion status of each job to test each loaded HDD, and allocating to each loaded HDD, via the selectively established communication channel with each loaded HDD, one test software thread per each job of the plurality of jobs to test each loaded HDD, according to the test software threads job completion status recordings for each loaded HDD, thereby directly testing each loaded HDD regardless of each HDD interface standard with the single host computer.

An HDD testing method according to the present invention may be implemented as software that is executable in a computer system. In this case, the above-described operational modules may be implemented as code segments that perform the processes of the present invention. The software or the code segments may be stored in a computer readable medium, including but not limited to storage media such as semiconductor memory devices, ROM's, flash memories, erasable ROM's (EROM's), floppy disks, optical disks, hard disks, optical fiber media, wireless radio frequency (RF) networks, etc. The software or the code segments may be transmitted as computer data signals together with carrier waves over a transmission medium or a communication network, such as electronic network channels, air, electromagnetic fields, RF networks, etc.

While the present invention has been particularly shown and described with reference to an exemplary embodiment thereof, it will be understood by those of ordinary skill in the art that various changes in form and details may be made therein without departing from the spirit and scope of the present invention as defined by the following claims and their equivalents.

What is claimed is:

1. A method of testing a plurality of hard disk drives randomly loadable and unloadable in a hard disk drive testing apparatus, the method comprising:
    checking whether hard disk drives have been loaded;
    sequentially allocating simultaneously run test threads, with one test thread allocated to each of the loaded hard disk drives;
    performing by each test thread a series of job operations of a test one by one for a corresponding loaded hard disk drive, as each test thread is allocated to the corresponding loaded hard disk drive; and
    recording a test status of each loaded hard disk drive whenever one job operation of the test by one of the test threads completes, to allow a next test thread to refer to the recorded test status to continue with a next job operation of the test for the corresponding loaded hard disk drive.

2. The method of claim 1, wherein the series of test job operations are ranked by priority, and
    the method further comprises:
    comparing, by each test thread, a priority rank of a test job operation scheduled to be performed on the test thread corresponding loaded hard disk drive with other priority ranks of other test job operations scheduled to be performed on the other loaded hard disk drives; and
    terminating running the test thread, by each test thread, if the priority rank of the test job operation for the test thread corresponding loaded hard disk drive is equal to or lower than the other priority ranks of the test job operations for the other loaded hard disk drives.

3. The method of claim 2, wherein the series of test job operations of the test for the corresponding loaded hard disk drive comprises supplying power to the hard disk drive, resetting the hard disk drive, self testing the hard disk drive with reference to downloaded relevant test scripts and codes, monitoring termination of the testing of the hard disk drive, and cutting off the supply of power to the hard disk drive, if the testing has been terminated, and
    wherein resetting the hard disk drive has the highest test job operation priority rank.

4. The method of claim 1, wherein a number of the test threads allocated to the loaded hard disk drives at the same time are limited depending on resources of the hard disk drive testing apparatus.

5. The method of claim 4, wherein the test threads communicate with each other to efficiently share the hard disk drive testing apparatus resources according to the recording of the test status of each loaded hard disk drive.

6. The method of claim 1, wherein the checking and the allocating of one test thread to each hard disk drive are periodically performed.

7. The method of claim 6, wherein the checking is performed within a first period, and the allocating of one test thread to each hard disk drive is performed within a second period, and wherein the first period is shorter than the second period.

8. The method of claim 1, wherein the series of test job operations to test the corresponding loaded hard disk drive comprises supplying power to the hard disk drive, resetting the hard disk drive, self testing the hard disk drive with reference to downloaded relevant test scripts and codes, monitoring termination of the testing of the hard disk drive, and cutting off the supply of power to the hard disk drive, if the testing has been terminated.

9. The method of claim 8, wherein the series of test job operations to test the corresponding loaded hard disk drive further comprises identifying a model name of the loaded hard disk drive and downloading the relevant test scripts and codes for the loaded hard disk drive from a database.

10. The method of claim 1, further comprising:
    selectively establishing a serial communication channel to each loaded hard disk drive via a plurality of input/output serial ports of a multi-port serial communication switch connected to serial ports of each loaded hard disk drive;
    creating an HDD port information data structure corresponding to each test for each loaded hard disk drive;
    recording in the HDD port information data structure of each test a port number of one of the input/output serial ports of the multi-port serial communication switch on which the serial communication channel to the loaded hard disk drive is established for the test and the test status, and
    synchronizing the performing of the job operations of each test by each test thread according to the HDD port information data structure.

11. A computer readable medium having embodied thereon a computer program that tests a plurality of hard disk drives randomly loadable and unloadable in a hard disk drive testing apparatus, the computer readable medium comprising:
    an event wait module that waits an occurrence of an event selected from a group comprising a HDD scanning thread execution event, a test thread execution event, a user interface service event, a HDD scanning thread execution start event, and a test thread execution start event, and calls a corresponding thread for an occurring event;
    a scan event service module called when the HDD scanning thread execution event is called and detects loading/unloading of the hard disk drives; and
    a test thread execution event service module called when the test thread execution event occurs, and tests loaded hard disk drives while checking a status of the loaded hard disk drives through communications with the loaded hard disk drives.

12. The computer readable medium of claim 11, wherein the test thread execution event service module performs for one of the loaded hard disk drives as a loaded hard disk drive a series of job operations sequentially one by one for testing the loaded hard disk drive by allocating one test thread per each job operation to the loaded hard disk drive.

13. The computer readable medium of claim 12, wherein the series of job operations are ranked by priority, and the test thread execution service module compares a priority rank of a scheduled job operation on a hard disk drive allocated to itself with other priority ranks of job operations scheduled to be performed on other hard disk drives, and terminates running if the priority rank of the job operation for the allocated hard disk drive is equal to or lower than the priority ranks of the job operations for the other had disk drives.

14. The computer readable medium of claim 13, wherein the series of job operations to test one of the loaded hard disk drives as a loaded hard disk drive comprises supplying power to the hard disk drive, resetting the hard disk drive, self-testing the hard disk drive with reference to downloaded relevant test scripts and codes, monitoring termination of the testing of the hard disk drive, and cutting off the supply of power to the hard disk drive if the testing has been terminated, and wherein the resetting of the hard disk drive has a highest priority rank.

15. The computer readable medium of claim 11, wherein the user interface service module creates the HDD scanning thread execution start event and the test thread execution start event when a user test start instruction is input, and the HDD scanning thread execution start event and the test thread execution start event periodically trigger the HDD scanning thread execution event and the test thread execution event, respectively.

16. The computer readable medium of claim 15, wherein the HDD scanning thread execution event occurs within a first period, the test thread execution event occurs within a second period, and the first period is shorter than the second period.

17. The computer readable medium of claim 12, wherein a number of test threads that run at the same time are limited depending on resources of the hard disk drive testing apparatus.

18. The computer readable medium of claim 17, wherein the test threads as objects communicate with each other to efficiently share the resources of the hard disk drive testing apparatus.

19. The computer readable medium of claim 11, wherein the test thread execution event service module for one of the loaded hard disk drives as a loaded hard disk drive performs a series of job operations one by one as the test thread execution event service module is called to test the loaded hard disk drive, and the series of job operations comprises supplying power to the hard disk drive, resetting the hard disk drive, self-testing the hard disk drive with reference to downloaded relevant test scripts and codes, monitoring termination of the test of the hard disk drive, and cutting off the supply of power to the hard disk drive if the test has been terminated.

20. The computer readable medium of claim 19, wherein the series of job operations further comprises identifying a model name of the loaded hard disk drive and downloading the relevant test scripts and codes to the loaded hard disk drive from a database.

21. The computer readable medium of claim 11, further comprising a display update thread service module called when the user interface service event occurs and informs a user of a test status of a loaded hard disk drive.

22. A method, comprising:
performing by a test software thread a plurality of jobs one by one according to a recorded completion status of each job to test each of a plurality of loadable devices; and
allocating to each loaded device, via a serial communication interface to each loaded device, one test software thread per each job of the plurality of jobs to test each loaded device, according to the test software threads job completion status recordings for each loaded device.

23. A machine readable data storage storing at least on program controlling a device testing apparatus, according to a process comprising:
performing by a test software thread a plurality of jobs one by one according to a recorded completion status of each job to test each of a plurality of loadable devices; and
allocating to each loaded device, via a serial communication interface to each loaded device, one test software thread per each job of the plurality of jobs to test each loaded device, according to the test software threads job completion status recordings for each loaded device.

24. A hard disk drive (HDD) testing apparatus, comprising:
a plurality of loadable and unloadable HDDs; and
a single host computer comprising a programmed computer processor controlling the single host computer according to a process comprising:
selectively establishing communication channels between the single host computer and each HDD,
performing by a test software thread a plurality of jobs one by one according to a recorded completion status of each job to test each loaded HDD, and
allocating to each loaded HDD, via the selectively established communication channel with each loaded HDD, one test software thread per each job of the plurality of jobs to test each loaded HDD, according to the test software threads job completion status recordings for each loaded HDD, thereby directly testing each loaded HDD regardless of each HDD interface standard with the single host computer.

25. The apparatus of claim 24, wherein
the HDDs each have a standard universal asynchronous receiver transmitter (UART) port, and
wherein the single host computer has one serial communication port and directly tests each HDD via selectively established serial communication channels between the one serial communication port of the single host computer and each HDD standard UART port.

26. The apparatus of claim 24, wherein the single host computer has the one serial communication port as a first serial communication port and a second serial communication port, and the apparatus further comprises:
a multi-port serial communication switch with circuitry communicably connectable to the first and second serial communication ports of the single host computer to establish a serial port selection channel according to the single host computer to selectively establish the serial communication channel between the second serial port of the single host computer and one of a plurality of input/output serial ports of the switch connected to the serial ports of the HDDs.

* * * * *